United States Patent [19]
Halbig

[11] 3,915,522
[45] Oct. 28, 1975

[54] TAPERED ROLLER BEARING ASSEMBLY

[75] Inventor: Adolf Halbig, Mainberg, Germany

[73] Assignee: SKF Industrial Trading and Development Company B.V., Amsterdam, Netherlands

[22] Filed: May 23, 1974

[21] Appl. No.: 472,860

[30] Foreign Application Priority Data
May 26, 1973 Germany................................ 199787

[52] U.S. Cl.................................. 308/214; 308/214
[51] Int. Cl.² ............................................ F16C 33/00
[58] Field of Search...................... 308/214, 212, 213

[56] References Cited
UNITED STATES PATENTS

| | | |
|---|---|---|
| 2,098,683 | 11/1937 | Wise .................................. 308/214 |
| 3,767,278 | 10/1973 | Knowles............................ 308/214 |

Primary Examiner—M. Henson Wood, Jr.
Assistant Examiner—Michael Mar

[57] ABSTRACT

A tapered roller bearing having a race ring, a plurality of rollers and a retaining member for holding the rollers on the ring. The retaining member is formed as an annulus, having a plurality of radial tongues which extend resiliently into an annular groove formed on the race ring adjacent the race surface, so as to abut the end of the rollers.

8 Claims, 3 Drawing Figures

TAPERED ROLLER BEARING ASSEMBLY

BACKGROUND OF THE INVENTION

The present invention relates to a tapered roller bearing and in particular to a roller bearing having separate edge supporting and retaining means for the rollers at at least one end.

In general tapered roller bearings are provided with an inner race ring which has a rim at each of its axial edges to hold and guide the rollers on the race surface. When the bearing is assembled, the cage in which the rollers are held, must then be stretched and radially widened and locked with the rollers in place so that it can be easily slid over the rim and then fitted about the race surface. In both stages of this process, (i.e. widening and insertion) the cage undergoes a plastic deformation, that is permanent deformation and not an elastic deformation. Because the cage does not resiliently resume its proper or defined shape its accurate mounting is prevented and the accuracy and precision of the bearing as a whole is adversely effected.

It has been attempted, in order to avoid this disadvantage, to provide an inner race ring without a retaining rim. The complete set of rollers and cage is then slipped axially on the ring from one end without any deformation. This has a drawback, however, in that the inner ring and the set of rollers do not form a unitary assembly which can be easily transported, stored and later installed. It has been proposed to provide snap rings or similar fasteners which are inserted with an annular groove in the face of the inner ring, or to shrink or upset the metal of the inner ring adjacent the race surface after insertion of the rollers and cage. In general such proposals are more expensive and complicated and do not provide a secure, supporting and holding means capable of absorbing operational loads.

It is an object of the present invention to provide a roller bearing overcoming the disadvantages and defects of the prior art.

It is an object of the present invention to provide a tapered roller bearing in which the cage can be mounted without any stretching or deformation.

It is another object of the present invention to provide a tapered roller bearing wherein the rollers and cage may be retained supported and guided with simple, low cost and yet reliable means.

It is a further object of the present invention to provide a tapered roller bearing having separable edge retaining means for the rollers which provide sufficient support and guidance under operational conditions.

These objects, others and numerous advantages will be apparent from the accompanying disclosure.

SUMMARY OF THE INVENTION

According to the present invention, the solution to the above problems and the objects enumerated are obtained by providing an annular profiled edge retaining member, shaped from sheet material, such as steel or the like, so as to have a plurality of radial tongues, separated by radial slits, which enter into and resiliently engage in an annular groove formed in the race ring on which it is mounted adjacent the race surface.

Preferably the profiled annular member is shaped with a U- cross section in which one shank is slit so as to provide the engaging tongues while the other shank remains un-slit and annularly unitary. The base of the U-shaped cross section may also be slit to provide added resiliency. The unslotted shank is adapted to rest on an extending portion of the race ring to thereby provide support and stability therefor. The unslotted shank may be further bent at its end to provide added strength and radial resiliency. The extending portion of the race ring may be cylindrical or itself taper (such as continuing the taper of the race surface) and the bent folded portion of the retaining member tapered to conform thereto.

In accordance with a further aspect of the present invention, the extending tongues engaging the groove of the ring are preferably formed with means adapted to secure the retaining member against twisting or rotation relative to the ring. Preferably such means comprise teeth or serations formed on the end of the tongue.

Preferably the present invention is most simply adapted for use in combination with the inner race ring of a tapered bearing. However, the same may be employed advantageously with the outer ring or with more conventional non-tapered bearings.

Full details of the present invention are set forth in the following description of its preferred embodiments and in the accompanying drawings.

DESCRIPTION OF INVENTION

Figure 1:
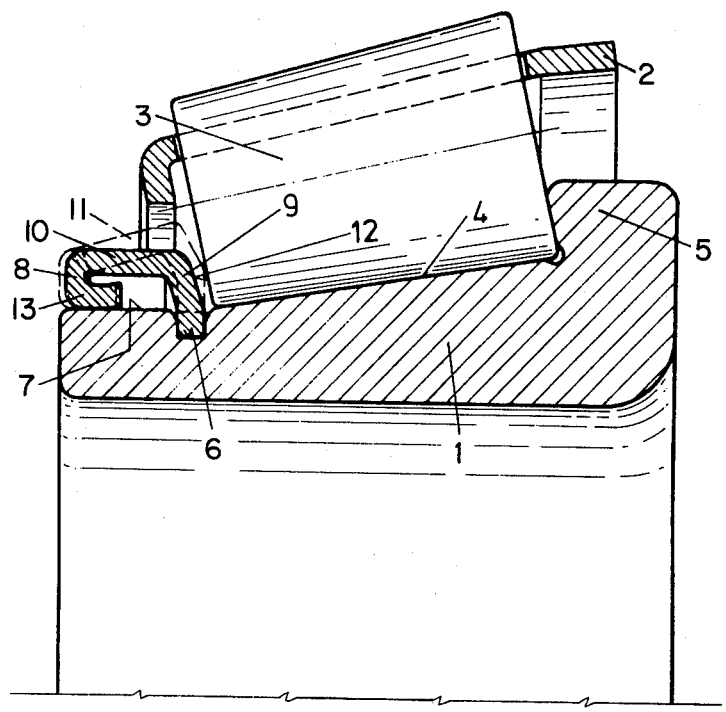
FIG. 1 depicts in cross section the upper portion of an inner race ring of a tapered roller bearing including the rollers and edge retaining ring according to the present invention.

As seen in FIG. 1 a tapered roller bearing inner ring 1, having an axis of rotation X—X is provided with a cage 2 in which conically tapered rollers 3 are held. The cage 2 and rollers 3 are slipped freely without stretching or deformation over the race surface 4 of the inner ring 1 and abut at one edge against a rim 5 integrally formed with the ring 1. The race surface 4 is angled with respect to the rotational axis, and thus also to the cylindrical inner bore of the ring 1, thus providing a wider thickness (larger outer diameter) at the end near the rim 5 and a smaller thickness (smaller outer diameter) at the other end. An annular groove 6 is cut on the outer surface of the inner ring 1 transversely to the rotational axis and adjacent the end of the race surface 4. A cylindrical shoulder 7 extends axially as part of the race ring 1.

The rollers are axially retained and supported at their edges by an annular profiled edge retaining member 8 preferably formed from sheet steel as a unitary cylinder or annulus. Other materials may be used. The retaining member 8 is profiled to assume a generally U-shaped cross section comprising a first shank 9, bent to a general radially inwardly (toward the axis of rotation) flange, a base 10 and a second shank 13. At least the first shank 9 and if desired a portion of the base 10 are slit with a plurality of narrow slots which form between themselves a plurality of radial tongues 11. The tongues 11 are resilient, being formed from the sheet steel, and are adapted to fit into and engage the slot 6, being thus fixed axially as well as radially. The outer surface 12 of the shank 9 and base 10 is smooth and rounded, running in a radial direction in engagement with the edge of the rollers. The slits and tongues are uniformly distributed over the periphery of the retaining member 8.

The second shank 13 is bent over at a 180° angle to form a double wall which engages and resiliently rests on the surface of the cylindrical extending portion 7. The shank 13 holds the retaining member 8 in place with firmness and security, its resiliency acting to force the tongues deeper into the hole 6. On insertion, the retaining ring is shoved axially over the extending end 7 causing the tongues 11 to splay or distend outwardly as seen in the dotted lines, until they enter in the groove 6, full lines. This arrangement holds the retaining member secure and its surface 12 against the rollers with a slight degree of play even under operational conditions.

Figures 2, 3:
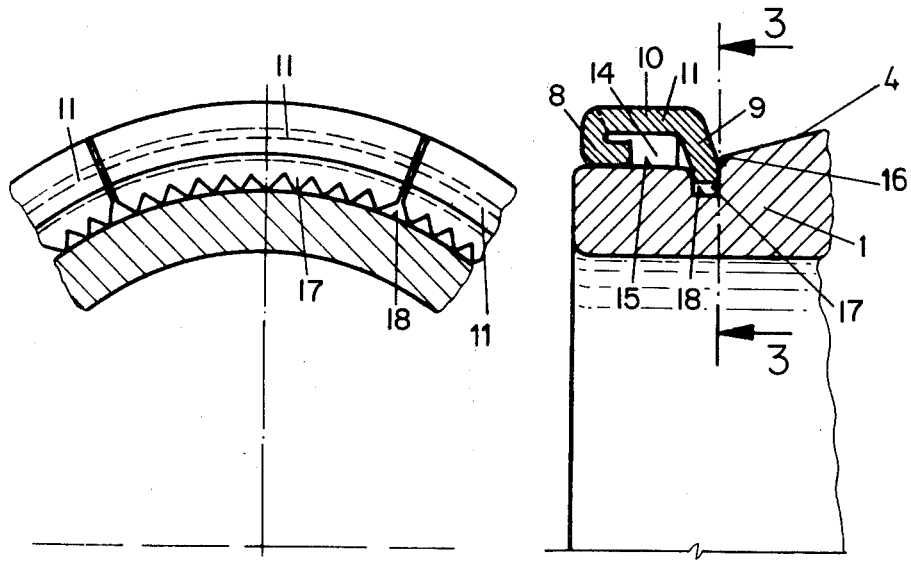
FIG. 2 is an enlarged sectional view of the extended end of the inner ring and edge retaining member, showing another embodiment thereof.
FIG. 3 is a sectional view taken along lines 3 - 3 of FIG. 2.

In FIG. 2 a modified form of the invention is depicted which basically conforms in principle to that of FIG. 1, and similar reference numerals are used. However, here, the extending portion 14 of the ring 1 is provided with an outer diameter substantially smaller than that of the smallest diameter of the race surface 4. In this way an inner retaining edge 16 is formed by which accurate axial fixing of the tongues of the profiled retaining member 8 can be obtained.

In order to secure the retaining member 8 against radial twisting or rotation relative to the race ring, the inner edges 17 of the tongues 11 can be formed in the shape of teeth ratchet or similar serrations which on insertion into the groove 6 engage with the bottom surface 18 to firmly grip it. Pressing of the tongues 11 into the groove 6 will enhance such fixed engagement. If desired only some of the tongues need be made with teeth.

The present invention is not, of course, confined to the specific examples shown, but may be modified and provided with other embodiments. For example, the cross sectional shape of the retaining member 8 may be other than U-shaped, and the teeth provided to engage the side walls of the grooves 6. Furthermore, the retaining member may be made from other metals than steel or from plastic or similar materials.

The present disclosure is therefore intended to be illustrative and not limiting of the scope of the present invention.

What is claimed:

1. A tapered roller bearing comprising a race ring having a race surface, and an annular rim at one end, a cage and roller assembly slidable axial from the opposite end onto said ring and having a plurality of tapered rollers adapted to ride on said race surface, an annular groove at said opposite end of said race ring adjacent said race surface, and means for retaining said cage and roller assembly on said race surface comprising an annular member having a plurality of radial tongues distributed about the periphery of said annular member resiliently extending radially into said annular groove, said annular member being fixed axial from the end of said rollers to permit limited axial play of said rollers.

2. The tapered roller bearing according to claim 1 wherein said retaining means is formed from a unitary cylinder of sheet material profiled to provide a radial flange having a plurality of radial slots forming said tongues.

3. The tapered roller bearing according to claim 2 wherein said race ring is formed with an integral rim at the edge opposite said retaining means for engaging the other edge of said rollers.

4. The roller bearing according to claim 1, wherein the retaining means has a U-shaped cross-section, one shank of which together with at least a portion of the base is provided with radial slots forming said tongues, while the remaining shank is unslotted and is adapted to rest on said race ring.

5. The roller bearing according to claim 4 wherein said race ring is formed with a shoulder for receiving said unslotted shank.

6. The roller bearing according to claim 5 wherein the unslotted shank is bent at the free end.

7. The roller bearing according to claim 1 including means on at least the portions of the tongues engaging in the annular groove for preventing twisting of said retaining means relative to said race ring.

8. The roller bearing according to claim 7 wherein said means for preventing twisting of said retaining means comprises teeth formed at the end of at least some of said tongues.

* * * * *